United States Patent
Hirano et al.

(10) Patent No.: US 6,639,750 B1
(45) Date of Patent: Oct. 28, 2003

(54) HEAD LOADING/UNLOADING CONTROL METHOD AND STORAGE DEVICE

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 09/676,273

(22) Filed: Sep. 28, 2000

(30) Foreign Application Priority Data

Nov. 24, 1999 (JP) .......................................... 11-332434

(51) Int. Cl.⁷ .............................................. G11B 21/02
(52) U.S. Cl. ...................................................... 360/75
(58) Field of Search ..................... 360/75, 69; 713/324, 713/340

(56) References Cited

U.S. PATENT DOCUMENTS 5,345,347 A * 9/1994 Hopkins et al. ............... 360/71
5,452,277 A * 9/1995 Bajorek et al. ............. 369/53.18
5,481,733 A * 1/1996 Douglis et al. ............... 713/324
5,682,273 A * 10/1997 Hetzler ......................... 360/75

FOREIGN PATENT DOCUMENTS

JP           6060578           3/1994

* cited by examiner

Primary Examiner—David Hudspeth
Assistant Examiner—K. Wong
(74) Attorney, Agent, or Firm—Greer, Burns & Crain, Ltd.

(57) ABSTRACT

This invention relates to a head loading/unloading method for moving a head that reads storage medium away from that storage medium, and makes optimal unloading operation possible. In a storage device comprising a storage medium 6, head 4, actuator 3 and control circuits 9, when the amount of continuous time when there is no access reaches the unload starting time, the head 4 is moved away from the storage medium 6. This unload starting time is made to be variable and is changed according to the state of the device. Therefore, an optimal unloading operation that corresponds to the state of the device is possible, that also has a balance among device life, access time and resistance to shock.

10 Claims, 8 Drawing Sheets

HEAD LOADING/UNLOADING CONTROL METHOD AND STORAGE DEVICE

BACKGROUND OF THE INVENTION

1. Field of the Invention

This invention relates to a head loading/unloading control method and storage device for moving away a head that reads a storage medium from the storage medium when it is not needed.

2. Description of the Related Art

Storage devices that have a head for reading storage medium are widely used. For example the magnetic disk drives used as a storage devices for computers comprise a magnetic disk, a head for reading from and writing to the magnetic disk, and a VCM actuator for positioning the head on a track of the magnetic disk. The storage density of these kinds of disk drives is rapidly increasing, and compact disk drives are currently being developed for them. Compact disk drives are separate and portable, and can also be used as the external storage device of a portable handheld computer.

Hard disk drives comprise a magnetic disk, a magnetic head, a VCM actuator, and a flexure (suspension). In this kind of hard disk drive, as the density of the magnetic disk has increased in recent years, the distance that the magnetic head floats above the magnetic disk has decreased. Therefore, the magnetic head can easily come in contact with the magnetic disk by even a small vibration and damage both the disk and head.

In order to prevent this, a hard disk drive has been proposed (for example in Japanese Unexamined published patent No. H6-60578) in which a ramp is installed at a position away from the magnetic disk, and when the head is not in operation, it moves to the position of the ramp so it is out of the way (this is called the unloading operation).

Recent hard disk drives and the electronic devices (computers, etc.) in which they are installed have become more and more portable. Therefore, the hard disk drive is used in an environment in which it is easy for it to receive external vibration. Moreover, since the electronic devices are driven by battery, the capacity of the power supply is limited. Therefore, it is desirable to reduce the power consumption.

To meet this demand, in prior storage devices, when there is no access (I/O command) for a continuous time, that time is counted, and when it reaches a specified time, the aforementioned unloading operation is performed and the head is moved away from the magnetic disk. In this method, when there is no access for a specified time, the head moves away from the magnetic disk, so it is possible to prevent damage to the disk and head even when there is external vibration. Also, since the ramp is supported mechanically, there is no need for drive current to flow to the VCM, so it is also possible to reduce the power consumption. Moreover, when there is access, the head returns from the ramp to the magnetic disk (this is called loading), and in this way the head is loaded only when in operation.

However, the prior art had the following problems.

(1) In the prior art, the specified time from when there was no more access until unloading started was fixed. This time is short (for example: 3 seconds) since there is a demand to keep the head unload for as long as possible when it is not in operation. Therefore, the unloading operation is performed frequently. In this unloading and loading operation, the ramp and the head slide against each other so there is the problem that the ramp is easily worn and had a short life. Normally, the ramp is made of a non-metallic material such as synthetic resin or plastic so that it is not abrasive to the metal material of the head, so it is worn by rubbing movement. The surface of the ramp is initially flat and smooth, and there is little dust that is generated by the sliding movement, however, as the surface is worn by the sliding motion, the surface becomes uneven, and relatively large particles begin to be worn away by the sliding motion. These large particles adhere to the disk and head causing data error to frequently occur. Therefore, it is necessary to set the life of the ramp to before this condition occurs. For example, approximately 300,000 times. When loading and unloading are frequently performed in order to improve the resistance to impact as described above, the ramp quickly reaches the end of its life. In compact storage devices such as a hard disk drive, the parts are very small, so replacement of just the ramp is almost impossible. Therefore, when the ramp reaches the end of its life, it is essentially the end of the life of the device itself. There is the problem of the life of the device being shortened by the ramp reaching the end of its life too quickly.

(2) Moreover, since the specified time is fixed, there is also the problem of decreased access time depending on the operating and access conditions.

(3) Furthermore, since the specified time is fixed, there is also the problem that it is not possible to effectively reduce the power consumption depending on the operating and access conditions.

SUMMARY OF THE INVENTION

The objective of this invention is to provide a head loading/unloading control method and a storage device for adequately performing the unloading operation in accordance to the state of the device.

Another objective of this invention is to provide a head loading/unloading control method and a storage device for lengthening the life of the device even when the unloading operation is performed.

Yet a further objective of this invention is to provide a head loading/unloading control method and a storage device for preventing a decrease in access time even when the unloading operation is performed.

Even yet a further objective of this invention is to provide a head loading/unloading control method and a storage device for further decreasing the power consumption even when the unloading operation is performed.

In order to accomplish these objectives, the head loading/unloading control method of this invention comprises: a step of unloading a head to a position away from a storage medium when the amount of time when there is no access command continues for a specified time; a step of loading the head to the storage medium when receive said access command; and a step of changing the specified time according to a status of a storage device.

In this form of the invention, the specified time that was formerly fixed (unload start time) is variable and is changed according to the state of the device. Therefore, it is possible to optimally perform the unloading operation according to the state of the device. In other words, an unloading operation becomes possible in which there is a balance among the device life, access time, and resistance to shock.

In another form of the invention, the step of changing the specified time comprises a step of counting the number of unloads, and a step of changing the specified time when the number of unloads exceeds a specified value. In this form of the invention, the specified time changes according to the number of unloads, so it is possible to increase the life of the device while at the same time maintain its resistance to shock even when the unloading operation is performed.

Other forms of the invention are as follows:

A step of changing the time comprises a step of changing the specified time according to the access state of the device. In this form of the invention, the specified time is changed according to the access state so it is possible to minimize the decrease in access time as well as decrease the power consumption even when the unloading operation is performed.

A step of changing the time comprises a step of changing the specified time according to the environment of the device. Since the specified time is changed according to the environment of the device, such as the installation location, temperature, frequency of shock, remaining battery charge, etc., it is possible to increase the effect of the invention such as improving the resistance to shock and decreasing the power consumption.

The storage device of this invention comprises a head that at least reads from a storage medium, an actuator for positioning the head, a ramp mechanism that support the head and which is installed at a position away from the storage medium, and a control means for unloading the head to the ramp position away from the storage medium when the amount of time that there is no access command reaches a specified time, and for loading the head to the storage medium when there is an access command, and where this control means changes the specified time according to the state of the device.

In this form of the invention, the specified time that was formerly fixed (unload start time) is variable and is changed according to the state of the device. Therefore, it is possible to optimally perform the unloading operation according to the state of the device. In other words, an unloading operation becomes possible in which there is a balance among the device life, access time, and resistance to shock.

The storage device of another feature of the invention comprises a head that at least reads from a storage medium, an actuator for positioning the head, a ramp mechanism that supports the head and which is installed at a position away from the storage medium, a control method for unloading the head to the ramp position away from the storage medium when the amount of time that there is no access command reaches a specified time, and a counter for counting the number times unloading is performed.

DESCRIPTION OF THE PREFERRED EMBODIMENTS

The explanation of the invention will be divided into an explanation of the storage device and an explanation of the loading/unloading process.

Storage Device

Figure 1:
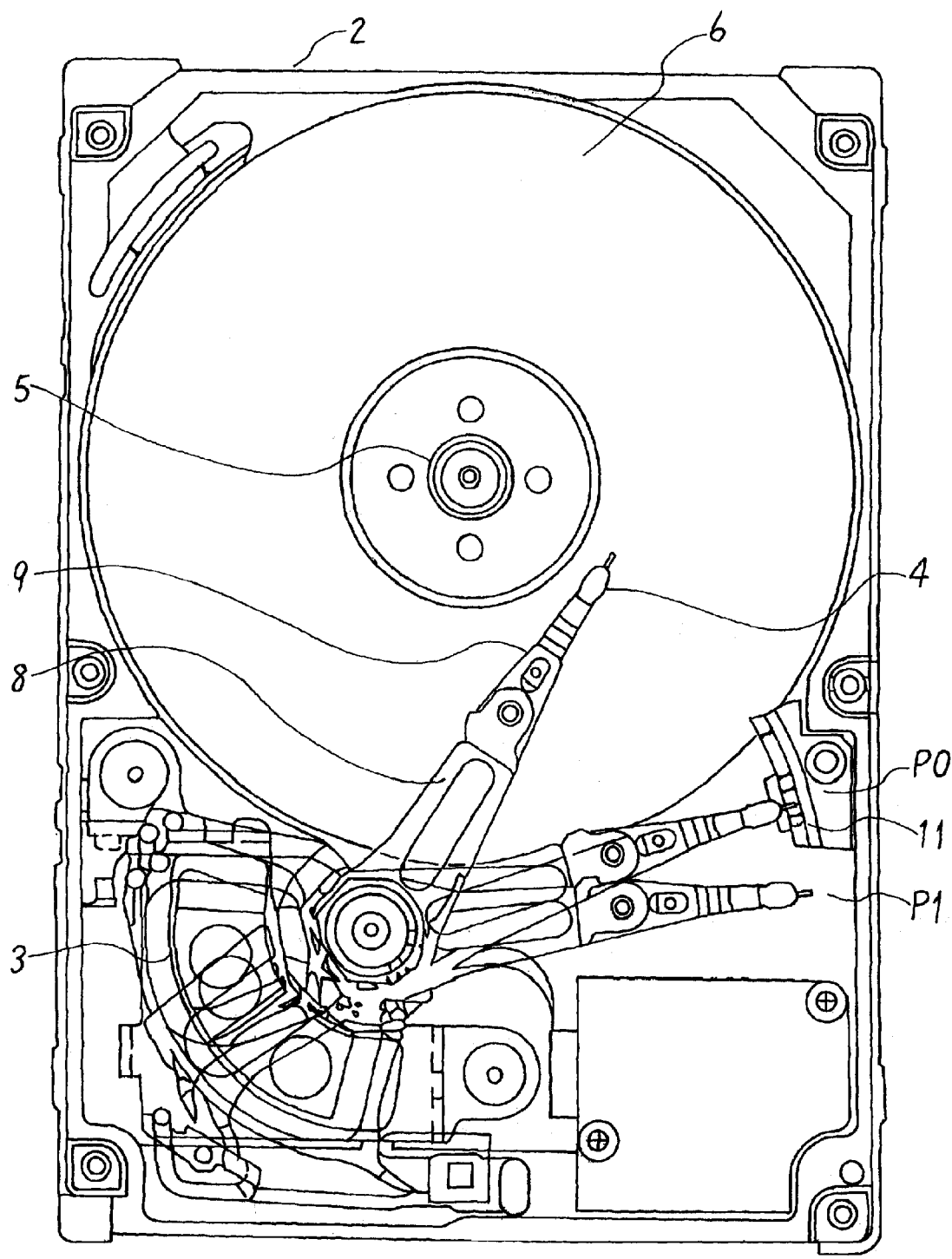
FIG. 1 is a top view of the storage device of an embodiment of this invention.
Figure 2:
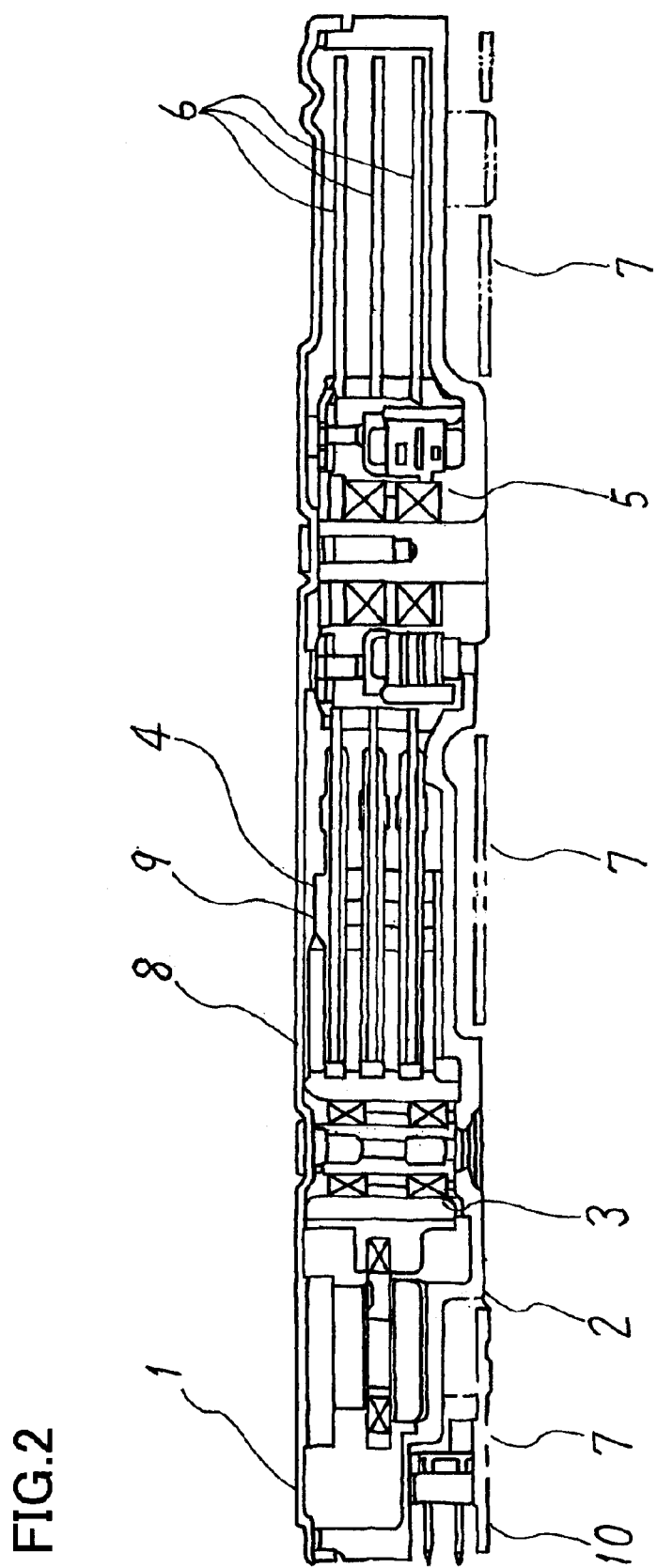
FIG. 2 is a cross-sectional drawing of the storage device in FIG. 1.
Figure 3:
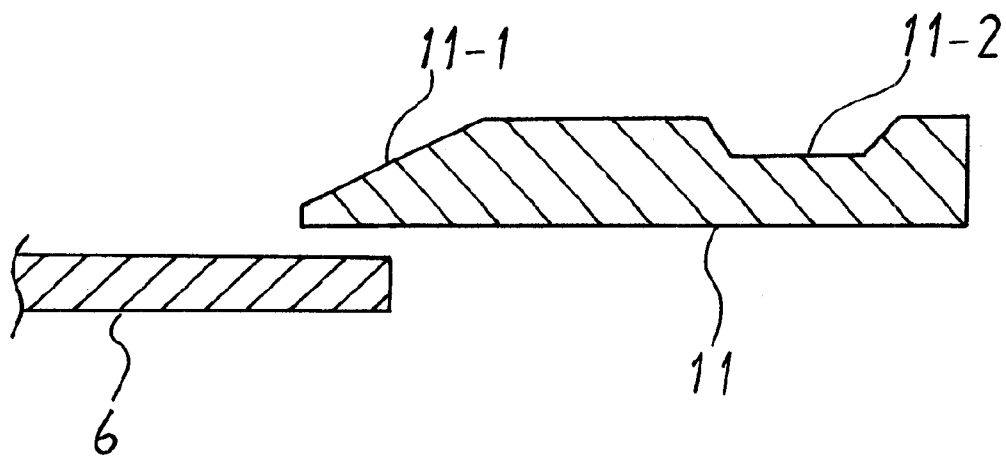
FIG. 3 is a cross-sectional drawing of the ramp in Fig.
Figure 4:
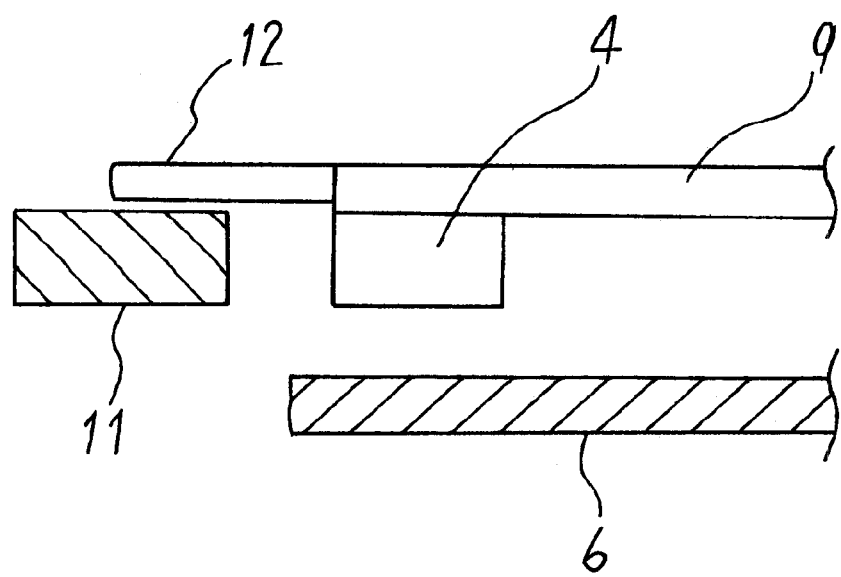
FIG. 4 is a front view of the ramp in FIG. 1.
Figure 5:
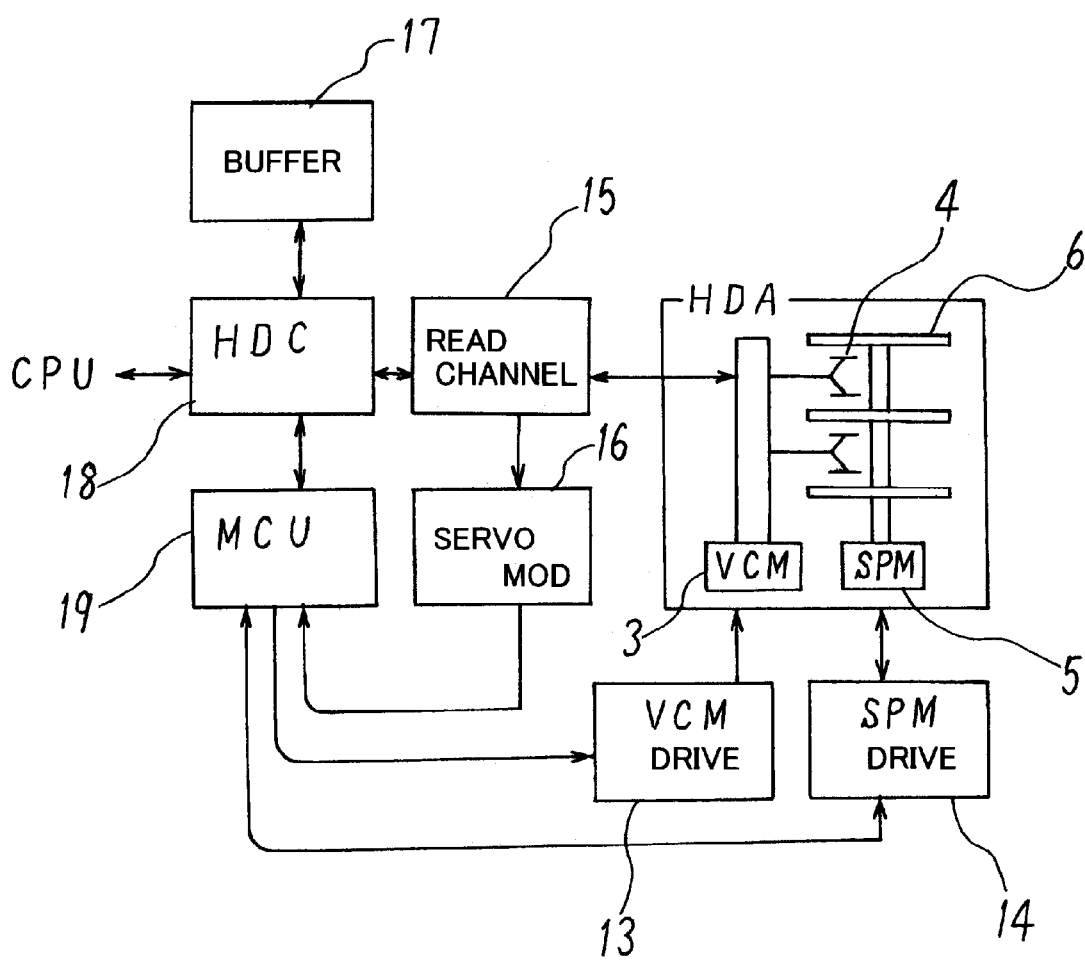
FIG. 5 is a block diagram of the storage device in FIG. 1

FIG. 1 is a top view of the storage device of an embodiment of this invention. FIG. 2 is a cross-sectional drawing of that storage device. FIG. 3 and FIG. 4 are cross-sectional drawings of the ramp. FIG. 5 is a block diagram of the storage device. In this example, a hard disk drive is used as the storage device.

As shown in FIG. 1 and FIG. 2, magnetic disks 6 are such that they form storage layers on a substrate (disk plate). The size of the magnetic disks 6 is 2.5 inches, and there are three disks inside the drive. A spindle motor 5 supports and rotates the magnetic disks 6. A magnetic head 4 is located on the actuator. The actuator comprises a rotating-type VCM (voice coil motor) 3, arm 8 and flexure (suspension) 9. The magnetic head 4 is attached to the tip of the flexure 9.

The magnetic head 4 reads data from the magnetic disks 6 and also writes data. The actuator 3 positions the magnetic head 4 at a desired track on the magnetic disks 6. The actuator 3 and spindle motor 5 are located on a drive base 2. A cover 1 covers the drive base 2 and separates the internal working of the drive from the outside. A printed circuit board 7 is located under the drive base 2, and it contains circuits for controlling the drive. A connector 10 is also located under the drive base 2 and connects the control circuits with the outside.

This drive is compact with dimensions of about 90 mm (Horizontal)×63 mm (Vertical)×10 mm (Width). It is used as the internal disk drive of a personal computer.

As shown in FIG. 1, there is a ramp 11 located away from the magnetic disks 6 on the drive base 2. The ramp 11 is made from synthetic resin or plastic, and when the head is unloaded, it supports the head 4. As shown in FIG. 4, there is a lift tab 12 on the tip of the suspension 9 that supports the magnetic head 4. The lift tab 12 comes in contact with the ramp 11.

As shown in FIG. 3, the ramp 11 comprises an inclined surface 11-1 and a depression 11-2. This inclined surface 11-1 is so the head 4 can move smoothly from the magnetic disks 6 to the ramp 11. The depression 11-2 is for mechanically securing the lift tab 12 when the head 4 is unloaded.

FIG. 5 is a block diagram of the control circuits on the printed circuit board 7 and in the drive.

A HDC (hard disk controller) 18 receives commands from the host CPU and generates internal magnetic disk drive control signals for controlling the interface with the host CPU such as receiving data, and for controlling the read/write format of the magnetic disk medium. A buffer 17 is used for temporarily storing write data from the host CPU and for temporarily storing the data read from the magnetic disk.

A MCU (micro controller) 19 comprises a microprocessor (MPU). The MCU (called the MPU below) 19 performs servo controls for positioning the magnetic head. The MPU 19 executes the program stored in memory, detects the position signal from the servo demodulation circuit 16, controls the VCM control current of a VCM drive circuit 13, and controls the drive current of a SPM drive circuit 14.

The VCM drive circuit 13 comprises a power AMP for sending drive current to the VCM (voice coil motor) 3. The SPM drive circuit 14 comprises a power AMP for sending drive current to the spindle motor (SPM) 5 that rotates the magnetic disk 6.

A read channel 15 is the circuit for reading and writing. The read channel 15 comprises a modulation circuit for writing the write data from the host CPU to the magnetic disk medium 6, a parallel-to-serial conversion circuit, a demodulation circuit for reading data from the magnetic disk medium 6 and a serial-to-parallel conversion circuit. The servo demodulation circuit 16 is a circuit for demodulating the servo pattern written to the magnetic disk medium 6, and comprises a peak hold circuit and an integrating circuit.

It is not shown in the figures, however in the drive HDA there is a head IC that comprises a write AMP that supplies current to the magnetic head 4 for writing, and a pre AMP for amplifying the read voltage from the magnetic head 4.

As shown in FIG. 1, loading/unloading control is performed by the MPU 19. In other words, when loaded, the magnetic head 4 is positioned above the magnetic disk 6. When an unload instruction is received, the VCM 3 is velocity-controlled to the outer stopper position. The velocity is detected from the counter electromotive voltage of the VCM 3. In this way, the lift tab 12 is guided to the inclined surface 11-1 of the ramp 11, it is then slid up the ramp 11 toward the depression 11-2 and contained inside the depression 11-2. Therefore, as shown in FIG. 1, the head 4 is held at a position P0 away from the magnetic disk 6.

At this position, the head 4 does not face the magnetic disk 6, so the magnetic head 4 does not hit the magnetic disk 6 when the disk drive is impacted. In addition, since the magnetic head 4 is mechanically held, the magnetic head 4 does not vibrate due to impact. This makes it possible to improve the resistance of the disk drive to impact. Moreover, since the head 4 is mechanically supported, there is no need for current to flow to the VCM 3. This makes it possible to reduce power consumption.

Furthermore, in an ultra-compact storage device, all of the parts are very densely arranged, so it heat radiation is difficult. With the head 4 at this position, since there is no current flowing to the VCM 3, it is possible to prevent the temperature of the device from rising.

On the other hand, when there is a load command, the VCM 3 drives the head 4 in the direction of the magnetic disk 6. Therefore, the lift tab 12 slides from the depression 11-2 down the inclined surface 11-1 of the ramp 11, and moves toward the magnetic disk 6. In this way, the magnetic head 4 returns to above the magnetic disk 6. It is then possible for the magnetic head 4 to read or write to the magnetic disk 6. Position P1 in FIG. 1, is the position of the actuator when the drive is assembled.

Here an example of a magnetic disk drive was explained as the storage device, however, it is also possible to use an optical disk drive such as a DVD or MO, a magnetic card device or an optical card device. Here a device capable of reading and writing is shown, however a read-only device (reproduction device) could also be used.

Loading/Unloading Process

Figure 6:
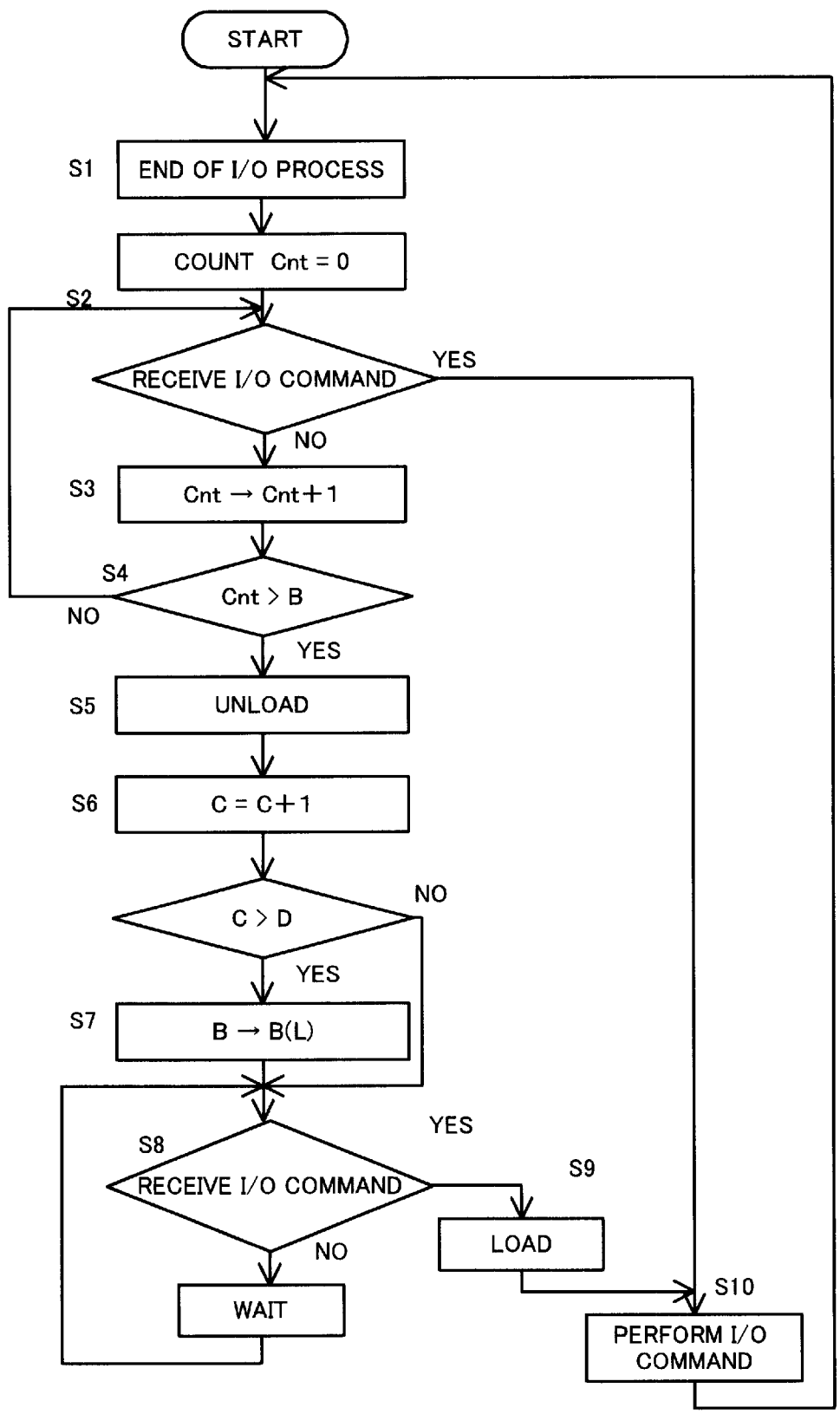
FIG. 6 is a flowchart showing the loading/unloading process of an embodiment of this invention.
Figure 7:
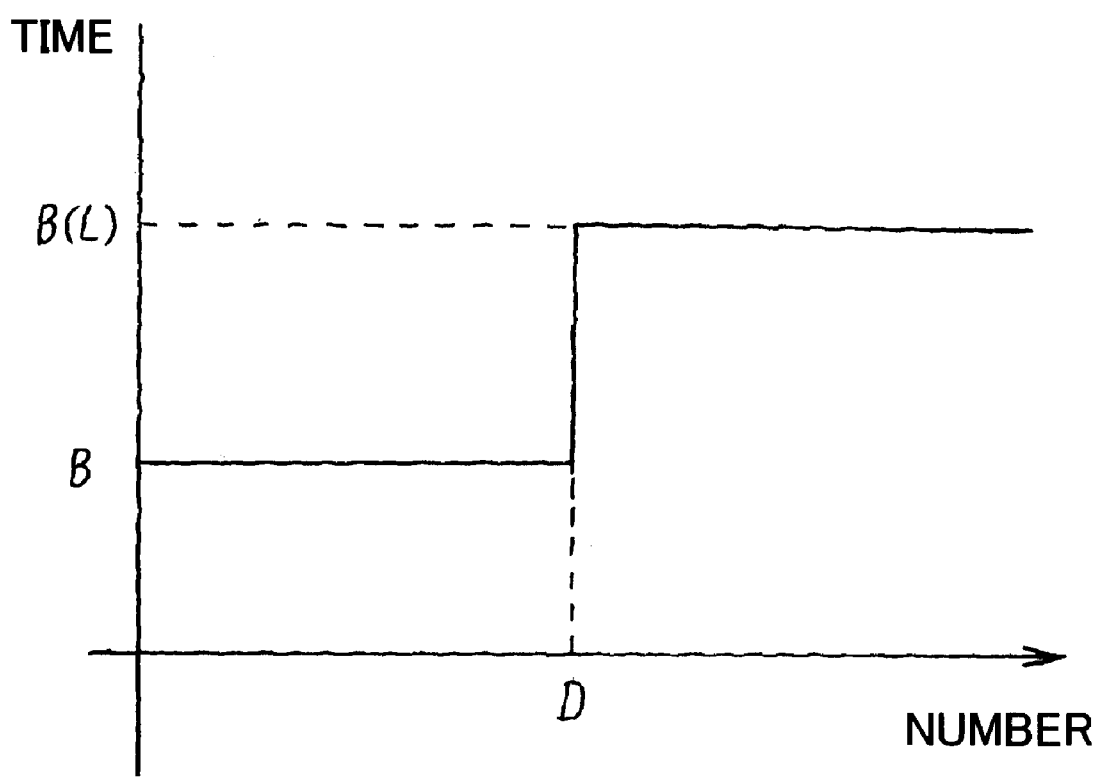
FIG. 7 is a drawing explaining the operations of the process in FIG. 6.

FIG. 6 is a flowchart showing the loading/unloading process of an embodiment of this invention, and FIG. 7 is a drawing explaining the operations.

(S1) The MPU 19 resets the unloading start timing counter 'Cnt' to '0' after input/output command processing ends.

(S2) The MPU 19 determines whether an I/O command (read command, write command) has come from the host. When the MPU 19 determines that an I/O command has come, it moves to the command execution process of step S10.

(S3) When the MPU 19 determines that there is no I/O command (read command, write command) from the host, it increments the counter 'Cnt' by '1'. This counter indicates the continuous time that there is no I/O command.

(S4) The MPU 19 determines whether the counter 'Cnt' is greater than the unload start time B. When the counter 'Cnt' is not larger than the unload start time B, it means that the continuous time has not reached the start time and the process returns to step S2.

(S5) When the counter 'Cnt' is greater than the unload start time B, it means that the start time has been reached and the MPU 19 executes the unloading process. As described above, it detects the counter electromotive voltage of the VCM 3, controls the velocity, and drives the head to the outer position. In this way, as described above, the lift tab 12 is positioned in the depression 11-2 in the ramp 11, and the head 4 is positioned at the position P0 in FIG. 1 away from the magnetic disk 6. Since the lift tab 12 is positioned in the depression 11-2 of the ramp 11, it is mechanically supported and there is no need for drive current to flow to the VCM3.

(S6) Next, the MPU 19 increments the unloading execution number C by '1'. Furthermore, it determines whether the unloading execution number C has exceeded the setting change number D.

(S7) When the unloading execution number C has exceeded the setted change number D, the unload start time B changes to B(L).

(S8) In this unloaded state, the MPU 19 determines whether there is an I/O command (read command, write command) from the host. When there is no command, it waits for a command from the host.

(S9) In the unloaded state, when the MPU 19 determines that there is an I/O command, it executes the loading process. In other words, the MPU 19 drives the head 4 by the VCM 3 in the direction toward the magnetic disk 6. The MPU 19 detects the velocity from the counter electromotive voltage of the VCM 3 and controls the velocity of the VCM 3. Therefore, the lift tab 12 slides from the depression 11-2 down the inclined surface 11-1 of the ramp 11 and moves toward the magnetic disk 6. In this way the magnetic head 4 returns to above the magnetic disk 6.

(S10) The MPU 19 executes the received I/O command. That is, the MPU 19 identifies the position signal from the servo demodulation circuit 16, controls the VCM control circuit flowing in the VCM drive circuit 13, and positions the magnetic head 4 at a specified track of the magnetic disk 6. The HDC 18, performs the read or write operation to the magnetic disk 6 by way of the magnetic head 4. Then processing returns to step S1.

As shown in FIG. 7, the unload start time up until the unload number reaches the setting change number D is set to a short time "B". Therefore, when there is no command, the head is immediately unloaded, increasing the resistance to shock and decreasing the power consumption. Also, as described above, there is little dust generated from the lamp 11 even when unloading is performed often, thus making stable reading and writing possible.

On the other hand, when the unload number exceeds the setting change number D, the unload start time changes to the longer time B(L). Unloading does not start when a condition of no command continues for a long time. Therefore, it is possible to prevent the unloading operation from occurring frequently. As mentioned above, as the ramp 11 is rubbed, dust is generated and reading and writing becomes difficult, there for before rubbing that would result in the generation of dust occurs, the unloading frequency is decreased and the life of the device is lengthened. In this case as well, the unloading operation is performed so it is possible to maintain resistance to shock and low power consumption.

In the explanation above, the unloading start time was shown to change between two levels, however, it is also possible to have three or more levels. Moreover, the degree of abrasion of the ramp 11 is measured by the unload number, however it is also possible to measure it by the load number or both the load and unload number.

Figure 8:
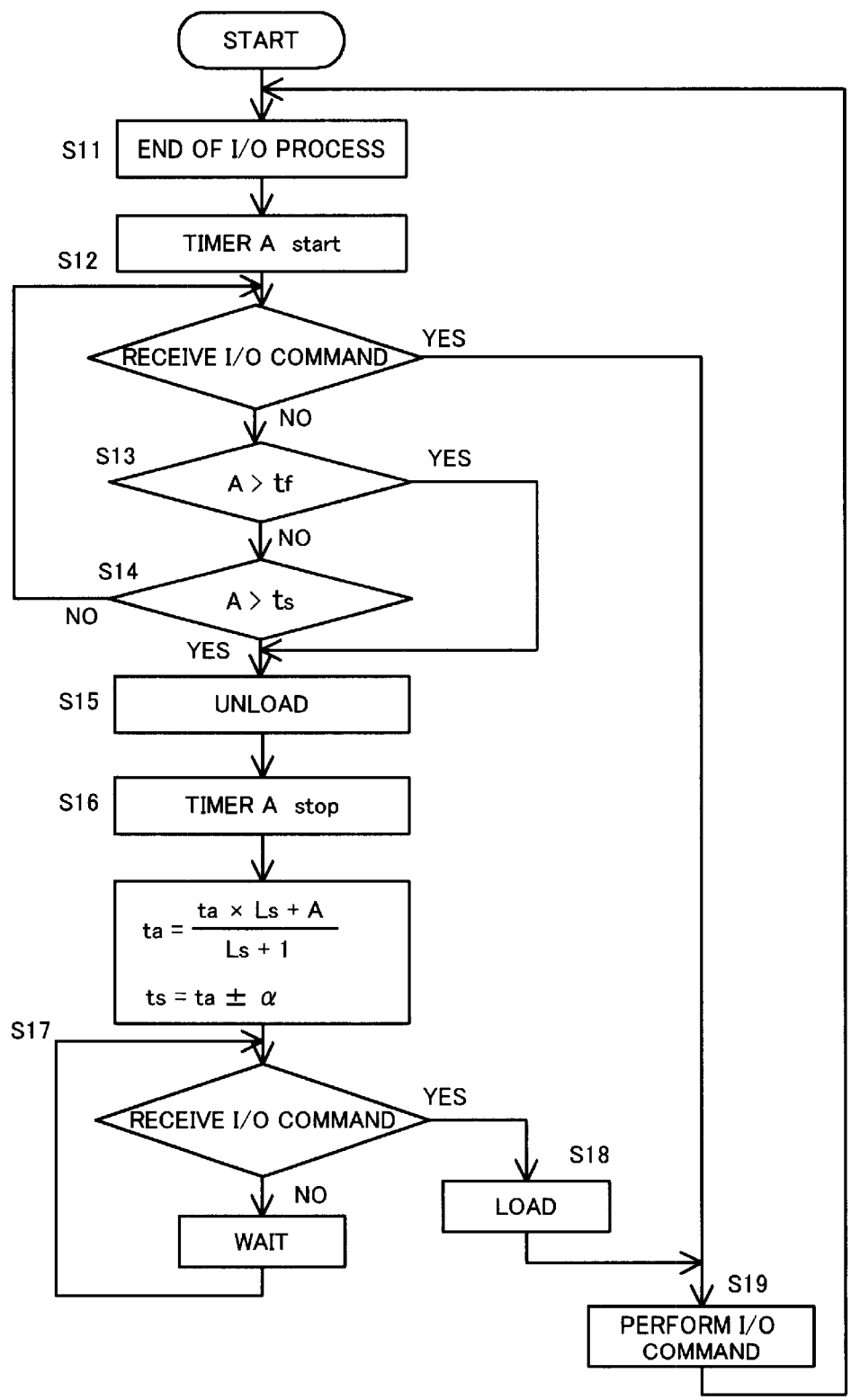
FIG. 8 is a flowchart showing the loading/unloading process of another embodiment of the invention.
Figure 9:
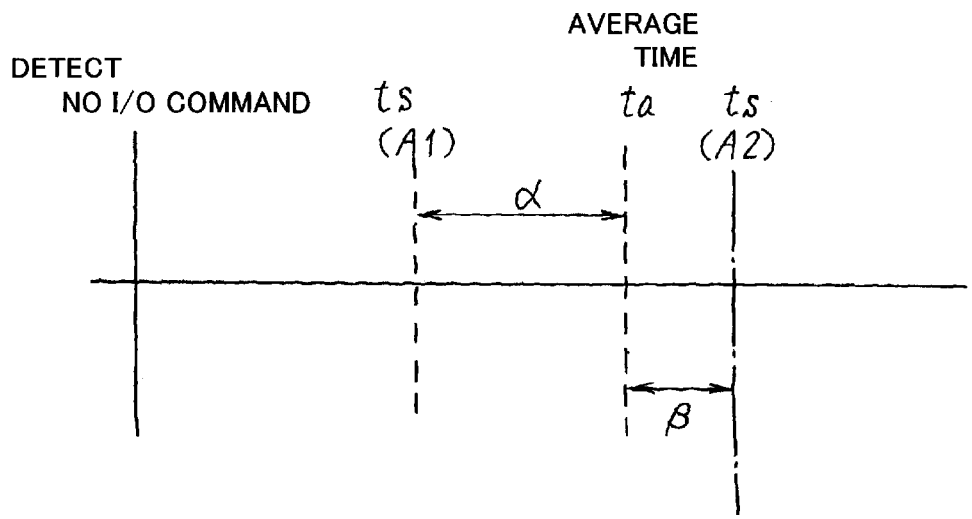
FIG. 9 is a drawing explaining the operations of the process in FIG. 8.

FIG. 8 is a flowchart showing the loading/unloading process of another embodiment of the invention, and FIG. 9 is a drawing explaining that operation.

(S11) When I/O command process ends, the MPU 19 starts the timer A for measuring the time when there is no command. Timer A indicates the continuous time when there is no I/O command.

(S12) The MPU 19 determines whether there is an I/O command (read command, write command) from the host. When the MPU 19 determines that there is an I/O command, it advances to the command execution process of step S20.

(S13) When the MPU 19 determines that there is no I/O command (read command, write command) from the host, it determines whether the value of timer A has exceeded the forced unload start time [tf] (fixed value). The forced unload start time [tf] is explained in FIG. 9 and described later. When the value of the timer A exceeds the forced unload start time tf (fixed value), the MPU 19 advances processing to step S15.

(S14) The MPU 19 determines whether the value of the timer A is larger than the unload start set time [ts]. When the value of the timer A is less than the unload start set time ts, it means that the continuous time has not reached the unload start set time ts, so it returns processing to step S12.

(S15) When the value of the timer A is larger than the unload start set time ts, it means that the continuous time has reached the starting time, so the MPU 19 executes the unloading operation. As explained above, it controls the velocity of the VCM 3, and moves the head to the outer position. In this way, as described above, the lift tab 12 is positioned in the depression 11-2 in the ramp 11, and the head 4 is positioned at the position P0 in FIG. 1 away from the magnetic disk 6. Since the lift tab 12 is positioned in the depression 11-2 in the ramp 11, it is mechanically supported and so there is no need for drive current to flow to the VCM 3.

(S16) Next, the MPU 19 stops the timer A. In addition, it adds the continuous time A for this time, and from the equation below, calculated the average continuous time ta(N) when there is no access. In the equation below, Ls is the total number of unloads up to the last time, ta(N−1) is the previous average continuous time with no access.

$$ta(N)=(ta(N-1) \times Ls + A)/(Ls+1)$$

Next, the unload start set time ts is calculated from this average value ta(N) with the equation below, and the unload start set time ts is updated.

$$ts=ta(N)-\alpha \text{ or}$$
$$ts=ta(N)+\beta$$

This equation will be explained later using FIG. 9.

(S17) In this unloaded state, the MPU 19 determines whether there is an I/O command (read command, write command) from the host. When there is no command, it waits for a command from the host.

(S18) In the unloaded state, when the MPU 19 determines that there is an I/O command, it executes the loading operation. In other words, the MPU 19 drives the head 4 by the VCM 3 in the direction of the magnetic disk 6. Therefore, the lift tab 12 slides from the depression 11-2 down the inclined plane 11-1 of the ramp 11 and moves toward the magnetic disk 6. In this way, the magnetic head 4 returns to above the magnetic disk 6.

(S19) The MPU 19 executes the received I/O command. That is, the MPU 19 identifies the position signal from the servo demodulation circuit 16, controls the VCM control current flowing in the VCM drive circuit, and positions the magnetic head 4 at a specified track of the magnetic disk 6. The HDC 18 performs the read or write operation to the magnetic disk 6 by way of the magnetic head 4. Then processing returns to step S11.

In this embodiment, the unload starting time is changed according to the average value of the continuous time when there is not access. Therefore, the unloading operation is controlled according to the access condition. In this way, it is possible to improve the access time as well as reduce power consumption even when the unloading operation is performed. As shown in FIG. 9, in step S16, when the time setting ts is calculated by the equation, [ta(N)−α], the unload starting time is set to before the next estimated I/O command time (average value) ts. Therefore, since the unload probability increases, it is possible to reduce power consumption and prevent heat generation in the VCM regardless of access.

On the other hand, as shown in FIG. 9, in step S16, when the time setting ts is calculated by the equation, [ta(N)+β], unloading is not executed until the time exceeds the next estimated I/O command time (average value) ts. Therefore, the head is on-track above the medium until the time reaches the next estimated I/O command time (average value) ts, and it is possible to reduce the access time.

The meaning of the forced unload starting time tf (fixed value) mentioned in step S13 will be explained. As mentioned above, when the unload starting time is set according to the average value of the continuous time with no access, there is a possibility that unloading will not be performed for a long time when the average value of the continuous time becomes long. Therefore, a fixed value is set for the forced unload starting time tf, and by forcing the unloading process to occur regardless of the average value of the continuous time with no access, it is possible to prevent the unloading process from not being executed for long periods of time.

Also, instead of this force starting time, it is possible to set an upper limit for the unload starting time that is set according to the average value of the continuous time with no access, and then the unload starting time can be set within this upper limit.

Figure 10:
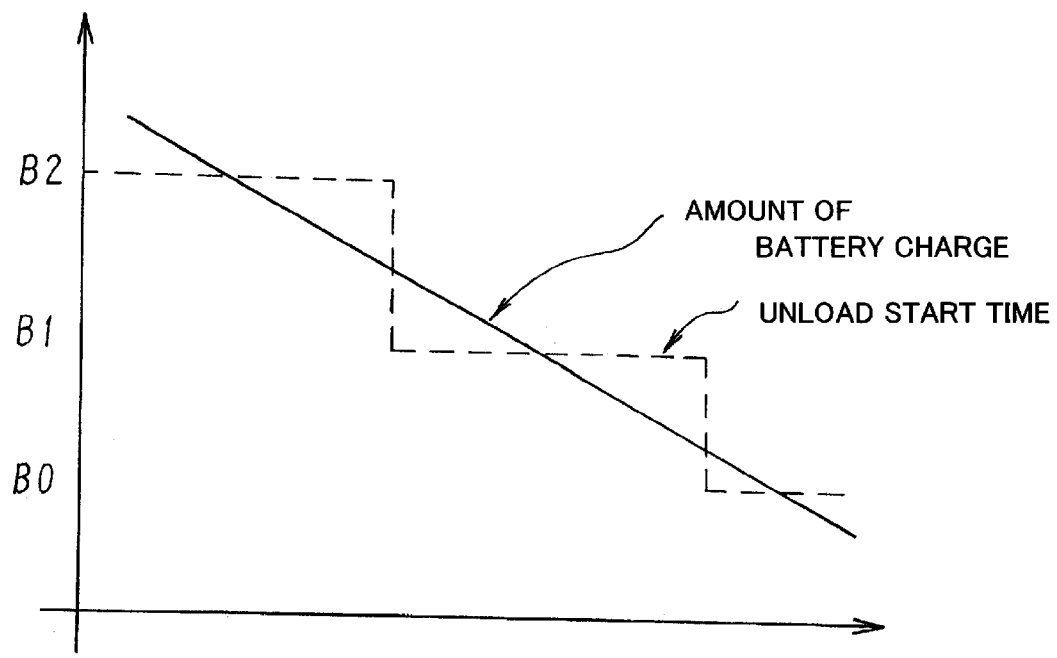
FIG. 10 is a drawing explaining the unloading start time of the other embodiment of the invention.

FIG. 10 is a drawing that explains the unload starting time for yet another embodiment of the invention. FIG. 10 shows how the unload starting time t changes (dotted line) according to the amount of battery charge of the personal computer (solid line).

As the amount of battery charge decreases, it is best for the amount of power consumption by each part to decrease in order to extend the battery capacity. Therefore, the unload starting time t becomes shorter as the amount of battery charge becomes less. Unloading is thus performed frequently, and by unloading, battery consumption of the disk drive becomes less. Therefore, it is possible to lengthen the use of the battery.

As a method for this, the MPU 19 can receive capacity information about the power supply from the control unit that monitors the personal computer's power supply, and similar to as described above, can change the unload starting time. In addition, since unloading is performed, it is possible to prevent the magnetic head from a head absorbing to the disk even when rotation of the magnetic disk stops. Therefore, by stopping the magnetic disk, it is possible to further reduce power consumption of the drive.

Moreover, in order to improve resistance to shock, it is desirable to change the unloading time according to the environment of the device when receiving a disturbance. For example, an acceleration sensor or shock sensor is installed in the drive, and any shock or disturbance is detected by the sensor, and when the shock or disturbance frequently exceeds a specified value, the unload starting time is made shorter. In this way, an environment prone to much disturbance is detected and unloading is performed frequently in order to improve the resistance to shock.

Similarly, When used on a desk, the possibility of receiving a shock or disturbance is small, however when use other than on a desk (for example, when moving), the possibility of receiving shock is high. The unload starting time changes according to this kind of condition. As a method for this, when used on a desk, for example, an AC power supply is used, and when not used on a desk, a DC power supply is used. Therefore, when an AC power supply is used, the unload starting time is made to be long, and when a DC power supply is used, the unload starting time is made to be short. The MPU 19 receives power-supply type information from the control unit that monitors the personal computer's power supply, and similar to as described above, it changes the unload starting time. This makes it possible to improve the resistance to shock.

Furthermore, as mentioned above, in a device where the temperature of the VCM is a problem, to detect the environment of the device, a temperature sensor can be installed for detecting the temperature of the drive, and the unload starting time can be controlled according to the output of the temperature sensor. By doing this, it is possible to prevent the temperature of the VCM from rising, and to better maintain the read/write performance of the drive while at the same time maintaining resistance to shock.

In addition, by controlling the unload starting time according to the environment conditions of the device, unloading control, that is also capable of the required performance, is possible.

Besides the embodiments described above, the invention can also take the following form.

(1) In the embodiments described above, the invention was explained for unloading control of the head of a magnetic disk drive, however, the invention can also be applied to other storage devices, such as unloading control of a head for an optical disk drive, etc.

(2) Similarly, a ramp having a different shape can be used.

The preferred embodiments of the present invention have been explained, however the invention is not limited to these embodiments and can be embodied in various forms within the scope of the present invention.

The invention as described above has the following effects:

(1) In this invention, the unload starting time, which was conventionally a fixed value, is made to be variable, and since it changes according to the state of the device, optimal unloading that corresponds to the state of the device is possible.

(2) In other words, an unloading operation that has a balance between device life, access time and resistance to shock is possible.

What is claimed is:

1. A head loading/unloading control method for the head of a storage device, in which the head at least reads data from a storage medium according to an access command, comprising:

a step of unloading said head to a position away from said storage medium when the amount of time when there is no said access command continues for a specified time;

a step of loading said head to said storage medium when said access command is received; and a step of changing said specified time according to a status of said storage device, wherein said changing step further comprises:

a step of counting the number of said unloading operations; and a step of changing said specified time when the number of said unloading operations exceeds a specified value.

2. A head loading/unloading control method for the head of a storage device, in which the head at least reads data from a storage medium according to an access command, comprising:

a step of unloading said head to a position away from said storage medium when the amount of time when there is no said access command continues for a specified time;

a step of loading said head to said storage medium when said access command is received; and a step of changing said specified time according to a status of said storage device, wherein said changing step comprising:

a step of changing the specified time according to the access state of the storage device, and wherein said changing step further comprises:

a step of starting a time count from a processing completion of said access command;

a step of stopping said time count after said unloading operation;

a step of calculating an average time of a measured time by stopping said time count; and a step of calculating said specified time from said average time, the method further comprising a step of unloading said head to a position away from said storage medium when said time count value reaches a fixed unloading start time.

3. The head loading/unloading control method according to claim 2, wherein said step of calculating said specified time comprises a step of calculating said specified time shorter than said average time.

4. The head loading/unloading control method according to claim 2, wherein said step of calculating said specified time comprises a step of calculating said specified time longer than said average time.

5. A head loading/unloading control method, for the head of a storage device, in which the head at least reads data from a storage medium according to an access command, comprising:

a step of unloading said head to a position away from said storage medium when the amount of time when there is no said access command continues for a specified time;

a step of loading said head to said storage medium when said access command is received; and a step of changing said specified time according to a status of said storage device, wherein said changing step comprises a step of changing the specified time according to at least one of a battery environment, a shock environment and a temperature environment of the storage device.

6. A storage device comprising:

a head that at least reads from a storage medium;

an actuator for positioning said head;

a ramp that supports said head and which is located at a position away from said storage medium; and a control means for unloading said head to said ramp position when the amount of time when there is no access command reaches a specified time, and for loading said head to said storage medium when there is said access command, wherein said control means counts the number of said unloading operations and changes said specified time when the number of said unloading operations exceeds a specified value.

7. A storage device comprising:

a head that at least reads from a storage medium;

an actuator for positioning said head;

a ramp that supports said head and which is located at a position away from said storage medium; and a control means for unloading said head to said ramp position when the amount of time when there is no access command reaches a specified time, and for loading said head to said storage medium when there is said access command, wherein said control means changes the specified time according to the access state of the storage device, and wherein said control means starts a time count from a processing completion of said access command, stops said time count after said unloading operation, calculates an average time of a measured time by stopping said time count and calculates said specified time from said average time, and wherein said control means unloads said head to a position away from said storage medium when said time count value reaches a fixed unloading start time.

8. The storage device according to claim 7, wherein said control means calculates said specified time shorter than said average time.

9. The storage device according to claim 7, wherein said control means calculates said specified time longer than said average time.

10. A storage device comprising:

a head that at least reads from a storage medium;

an actuator for positioning said head;

a ramp that supports said head and which is located at a position away from said storage medium; and a control means for unloading said head to said ramp position when the amount of time when there is no access command reaches a specified time, and for loading said head to said storage medium when there is said access command, wherein said control means changes the specified time according to at least one of a battery environment, a shock environment and a temperature environment of the storage device.

* * * * *